US011273835B2

(12) United States Patent
Stübing et al.

(10) Patent No.: US 11,273,835 B2
(45) Date of Patent: Mar. 15, 2022

(54) SYSTEM FOR A VEHICLE

(71) Applicant: Continental Teves AG & Co. oHG, Frankfurt (DE)

(72) Inventors: Hagen Stübing, Oberursel (DE); Oliver Fochler, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 199 days.

(21) Appl. No.: 16/446,293

(22) Filed: Jun. 19, 2019

(65) Prior Publication Data
US 2019/0299996 A1 Oct. 3, 2019

Related U.S. Application Data

(63) Continuation of application No. PCT/DE2017/200137, filed on Dec. 19, 2017.

(30) Foreign Application Priority Data

Dec. 21, 2016 (DE) ...................... 10 2016 225 760.9

(51) Int. Cl.
| | |
|---|---|
| *B60W 40/04* | (2006.01) |
| *B60W 30/18* | (2012.01) |
| *B60W 40/09* | (2012.01) |
| *B60W 50/14* | (2020.01) |
| *B60W 30/12* | (2020.01) |
| *B60W 30/16* | (2020.01) |

(52) U.S. Cl.
CPC ............ *B60W 40/04* (2013.01); *B60W 30/12* (2013.01); *B60W 30/16* (2013.01);
(Continued)

(58) Field of Classification Search
CPC ...... B60W 40/04; B60W 30/12; B60W 30/16; B60W 30/18145; B60W 30/18163; B60W 40/09; B60W 50/14
See application file for complete search history.

(56) References Cited

U.S. PATENT DOCUMENTS

| | | | |
|---|---|---|---|
| 2012/0271484 A1 | 10/2012 | Feit et al. | |
| 2013/0245894 A1* | 9/2013 | Huth ..................... | B60R 21/013 |
| | | | 701/45 |

(Continued)

FOREIGN PATENT DOCUMENTS

| | | |
|---|---|---|
| DE | 102013224118 A1 | 6/2014 |
| DE | 102013019141 A1 | 5/2015 |

(Continued)

OTHER PUBLICATIONS

International Search Report and Written Opinion dated Apr. 20, 2018 from corresponding International Patent Application No. PCT/DE2017/200137.

(Continued)

*Primary Examiner* — Peter D Nolan
*Assistant Examiner* — Mikko Okechukwu Obioha

(57) ABSTRACT

A system for a vehicle, having a driver monitoring device with a sensor device and with a first camera, an environment detection device with sensors for surroundings acquisition, a control unit and a classifier. Using the environment detection device and the classifier, traffic scenarios A and B may be classified. Using the driver monitoring device, it is possible to determine whether a direction of view of the driver is directed towards a traffic situation and whether the driver has their hands on a steering wheel of the vehicle. Using the control unit, it is possible, on the basis of information from the driver monitoring device and the environment detection device, to determine whether the driver is capable of resolving the traffic scenario classified as A or B within a response time.

11 Claims, 4 Drawing Sheets

(52) U.S. Cl.
CPC .................. *B60W 30/18145* (2013.01); *B60W 30/18163* (2013.01); *B60W 40/09* (2013.01); *B60W 50/14* (2013.01); *B60W 2420/42* (2013.01); *B60W 2510/202* (2013.01); *B60W 2540/18* (2013.01); *B60W 2540/22* (2013.01); *B60W 2552/30* (2020.02); *B60W 2554/00* (2020.02); *B60W 2554/4041* (2020.02); *B60W 2554/801* (2020.02); *B60W 2554/804* (2020.02); *B60W 2555/60* (2020.02)

(56) References Cited

U.S. PATENT DOCUMENTS

| 2014/0136044 | A1* | 5/2014 | Conrad | G01S 13/931 |
| | | | | 701/23 |
| 2016/0068103 | A1* | 3/2016 | McNew | B60W 30/12 |
| | | | | 701/23 |
| 2018/0354555 | A1* | 12/2018 | Sheng | B62D 5/0463 |
| 2021/0049908 | A1* | 2/2021 | Pipe | G08G 1/0129 |

FOREIGN PATENT DOCUMENTS

| DE | 102014213959 A1 | 1/2016 |
| DE | 102014118958 A1 | 6/2016 |
| EP | 3075618 A2 | 10/2016 |

OTHER PUBLICATIONS

German Office Action dated Nov. 26, 2017 for corresponding German Patent Application No. 10 2016 225 760.9.

\* cited by examiner

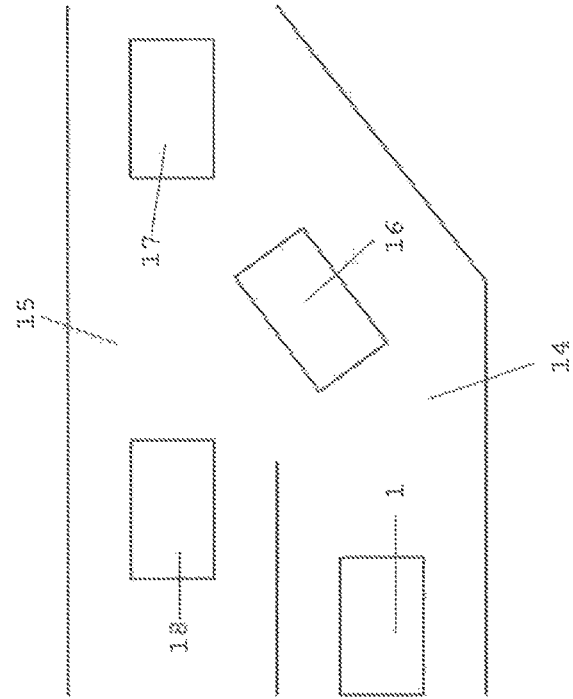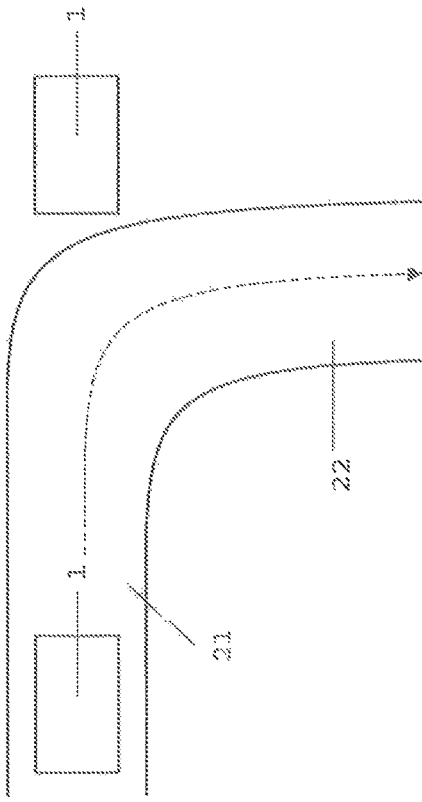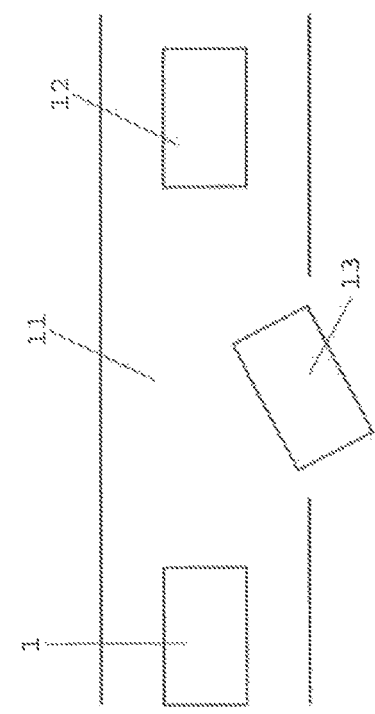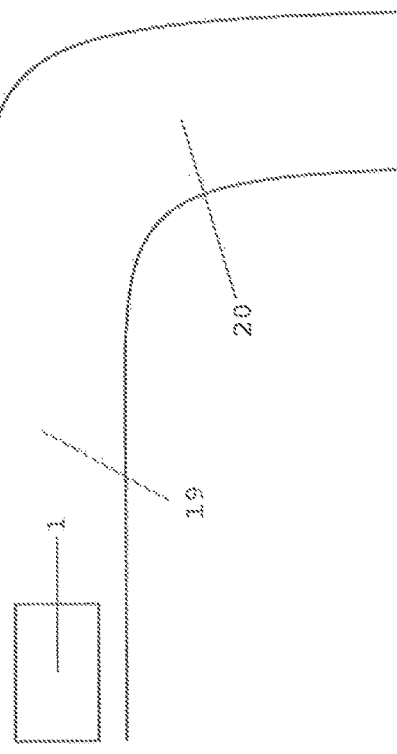

SYSTEM FOR A VEHICLE

CROSS-REFERENCE TO RELATED APPLICATIONS

This application claims the benefit of PCT Application PCT/DE2017/200137, filed Dec. 19, 2017, which claims priority to German Application DE 10 2016 225 760.9, filed Dec. 21, 2016. The disclosures of the above applications are incorporated herein by reference.

FIELD OF THE INVENTION

The invention relates to a system, in particular a driver assistance system for a vehicle.

BACKGROUND OF THE INVENTION

Systems with automated driving functions, for example at SAE Level 3 or higher, enable the driver to turn their attention away from the traffic for a certain time. In comparison with less automated driving functions, for example at SAE Level 2 or lower, the driver cannot in the meantime be assumed to be the fallback position. Every automated driving function has certain system limits, which lead, in certain traffic scenarios (roadworks etc.), to the driver having to take back control of the vehicle. With automated driving functions, the driver is allowed longer notice than with less automated driving functions. If, after a take-over request, the driver does not take over control of the vehicle, a minimum risk maneuver has to be initiated so as to avoid an accident situation.

Depending on the traffic situation, a system limit may however be reached very rapidly, such that the driver may no longer be given the planned notice to respond. Possible traffic scenarios are in this case for example sudden loss of charge or sudden sharp bends. Handover to the driver in such traffic scenarios represents a critical phase, since the driver may only deal with the situation through their intervention if they have also detected the traffic scenario in good time and are able to interpret it. Depending on the situation, it may be more advantageous for the system to retain control, rather than the driver taking over, and optionally initiate a minimum risk maneuver.

Making the right decision in the respective scenarios is safety-critical and must be made by every highly automated system.

SUMMARY OF THE INVENTION

It is the object of the present invention to provide a system for a vehicle, wherein the system enables an assessment of whether a driver of the vehicle is capable of taking over control of the vehicle in a given traffic situation or whether it is more advantageous for the system to retain control.

The object is achieved by the subject matter described herein. Advantageous embodiments constitute the subject matter of the subsequent description and the figures.

According to a first aspect of the invention, a system is provided for a vehicle, in particular a driver assistance system for the vehicle. The system comprises a driver monitoring device with a sensor device and with a first camera, an environment detection device with sensors for surroundings acquisition, in particular selected from the group of a second camera, a LiDAR apparatus and a radar device. The system further comprises a control unit and a classifier.

The sensor device is designed to detect whether at least one hand of a driver of the vehicle is in contact with a steering wheel of the vehicle, and to generate corresponding contact data. To this end, the sensor device may for example have a capacitance sensor. Alternatively or in addition, the sensor device may be configured to measure a torque from the hand of the driver acting on the steering wheel.

The first camera is configured to detect whether a direction of view of the driver is directed towards a traffic situation in which the vehicle is situated and to generate corresponding direction of view data. The detection makes it possible, in particular, to identify whether the direction of view of the driver is directed towards the road on which the vehicle is moving. The detection may also comprise an indication whether the direction of view of the driver is directed towards objects which are situated or moving on or next to the road on which the vehicle is moving. Cameras may for example be used which are capable of determining whether the direction of view of the driver of the vehicle is directed onto a road on which the vehicle is moving ("eyes on road"), or even to determine towards what individual objects the direction of view of the driver of the vehicle is directed ("eyes on object").

A first one of the sensors for surroundings acquisition, in particular the second camera, is configured to detect lane information and object information in the external environment of the vehicle, and a second one of the sensors for surroundings acquisition, in particular the radar device, is configured to detect objects in a region in front of the vehicle. The sensors for surroundings acquisition, in particular the second camera and the radar device, are furthermore configured to acquire a traffic scenario from the detected objects, lane information and object information and transmit it to the classifier.

The classifier is configured to identify, on the basis of the traffic scenario, whether a system limit is reached after a response time has elapsed and, if a system limit is identified, to classify the traffic scenario into a traffic scenario A and a traffic scenario B, wherein the driver of the vehicle may better resolve the traffic scenario A if the direction of view of the driver is directed towards the traffic situation in which the vehicle is situated, and wherein the driver of the vehicle may better resolve the traffic scenario B if at least one hand of the driver is in contact with the steering wheel. The response time is in this case a maximum possible response time before the system limit is reached. The response time is in other words a period, within which either the driver has to respond appropriately to the acquired traffic scenario, in order to resolve it, or a "minimum risk maneuver" has to be initiated by the driving system in order to resolve the traffic scenario.

The traffic scenario A may for example include the filtering-in of a further vehicle in the region ahead of the vehicle or the merging of two directly adjacent lanes in the same direction of travel in the region ahead of the vehicle. These traffic scenarios A are better resolved by the driver of the vehicle if the driver is observing the traffic, a fact which may be detected by the driving monitoring device identifying whether the direction of view of the driver is directed towards the traffic situation in which the vehicle is situated. On the other hand, in the present traffic scenarios A, a driver who, despite having their hands on the steering wheel, turns their gaze away from the traffic, might grasp the traffic scenario less well.

The traffic scenario B may for example include a sharp bend, a discrepancy between the course of a bend and a steering angle of the vehicle or a sudden extreme change in road conditions. These traffic scenarios B are better resolved by the driver of the vehicle if the driver has at least one of their hands on the steering wheel, a fact which may be detected by the sensor device. On the other hand, in the present traffic scenarios B, a driver who, despite looking at the traffic, does not have their hands on the steering wheel, might grasp the traffic scenario B and thus the system limits less well.

The control unit may be configured, in the case of an identified system limit and a classified traffic scenario A or B, to evaluate on the basis of the contact data or the direction of view data whether the driver is capable of resolving the traffic scenario A or B within the response time, wherein the control unit may be configured to compare an estimated response time of the driver with the response time until the system limit is reached. The control unit may for example be a central control unit which receives the classified traffic scenarios A or B with system limits and response times, the contact data and the and direction of view data and comes to a decision, on the basis of these data, as to whether the driver or the system may better deal with traffic scenario A or B.

If a system limit with a response time and a traffic scenario A have been identified, the control unit may conclude on the basis of the direction of view data whether the driver of the vehicle is able to ease or resolve traffic scenario A, i.e. in particular avoid an accident situation, within the maximum possible response time before the system limit is reached. If, for example, a system limit with a response time and filtering-in of a further vehicle in the region ahead of the vehicle are identified, the control unit may compare an estimated response time of the driver with the maximum possible response time before the system limit is reached. If the response time of the driver is less than the maximum possible response time before the system limit is reached, a "take-over request" to the driver may be initiated, for example in the form of an optical indication on a display or in the form of an acoustic announcement via an audio system. If, however, the response time of the driver is greater than the maximum possible response time before the system limit is reached, the control unit may initiate a minimum risk maneuver.

Provision is therefore made according to one embodiment for the control unit to be configured, in the case of an identified system limit and a traffic scenario classified as A, firstly to draw the conclusion that the driver is capable of resolving the traffic scenario A within the response time, if the direction of view data include the fact that the direction of view of the driver is directed towards the traffic situation in which the vehicle is located, and secondly to generate a take-over request to the driver. Furthermore, the control unit is configured firstly to draw the conclusion that the driver is not capable of resolving the traffic scenario A within the response time if the direction of view data include the fact that the direction of view of the driver is not directed towards the traffic situation in which the vehicle is situated and secondly to initiate a minimum risk maneuver of the vehicle.

If a system limit with a response time and a traffic scenario B have been identified, the control unit may conclude on the basis of the contact data whether the driver of the vehicle is able to ease or resolve traffic scenario B, i.e. in particular avoid an accident situation, within the maximum possible response time before the system limit is reached. If, for example, a system limit with a response time and a particularly sharp bend in the region ahead of the vehicle are identified, the control unit may compare an estimated response time of the driver with the maximum possible response time before the system limit is reached. If the response time of the driver is less than the maximum possible response time before the system limit is reached, a "take-over request" to the driver may be initiated, for example in the form of an optical indication on a display or in the form of an acoustic announcement via an audio system. If, however, the response time of the driver is greater than the maximum possible response time before the system limit is reached, the control unit may initiate a minimum risk maneuver.

Provision is therefore made according to one embodiment for the control unit to be configured, in the case of an identified system limit and a traffic scenario classified as B, firstly to draw the conclusion that the driver is capable of resolving the traffic scenario B within the response time, if the contact data include the fact that at least one hand of the driver is in contact with the steering wheel of the vehicle, and secondly to generate a take-over request to the driver. Furthermore, the control unit is configured firstly to draw the conclusion that the driver is not capable of resolving the traffic scenario B within the response time if the contact data include the fact that neither hand of the driver of the vehicle is in contact with the steering wheel of the vehicle, and secondly to initiate a minimum risk maneuver of the vehicle.

The estimated response time of the driver may be stored as a constant, wherein the control unit may access the constant. Alternatively, the control unit may be configured to determine continuously the estimated response time of the driver on the basis of the traffic scenario classified as A and the direction of view data or on the basis of the traffic scenario classified as B and the contact data. In this way, the currently possible response time may be continuously pre-evaluated on the basis of the driver's condition. In this case, the response time is thus not constant, but rather dependent on a combination of a situation class and the driver's condition.

According to a second aspect of the invention, a vehicle is provided, for example a motor vehicle such as an automobile, bus or truck. The vehicle comprises a system according to the first aspect of the invention, wherein the sensor device, the first camera, the second camera and the radar device are mounted at suitable points on the vehicle in order to be able to fulfill the functions within the system according to the first aspect of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Exemplary embodiments of the invention are explained in greater detail below with reference to schematic drawings, in which:

FIG. 2 is a plan view of a first traffic scenario A, FIG. 3 is a plan view of a second traffic scenario A, FIG. 4 is a plan view of a first traffic scenario B, FIG. 5 is a plan view of a second traffic scenario B.

DETAILED DESCRIPTION OF THE PREFERRED EMBODIMENTS

The following description of the preferred embodiment(s) is merely exemplary in nature and is in no way intended to limit the invention, its application, or uses.

Figure 1:
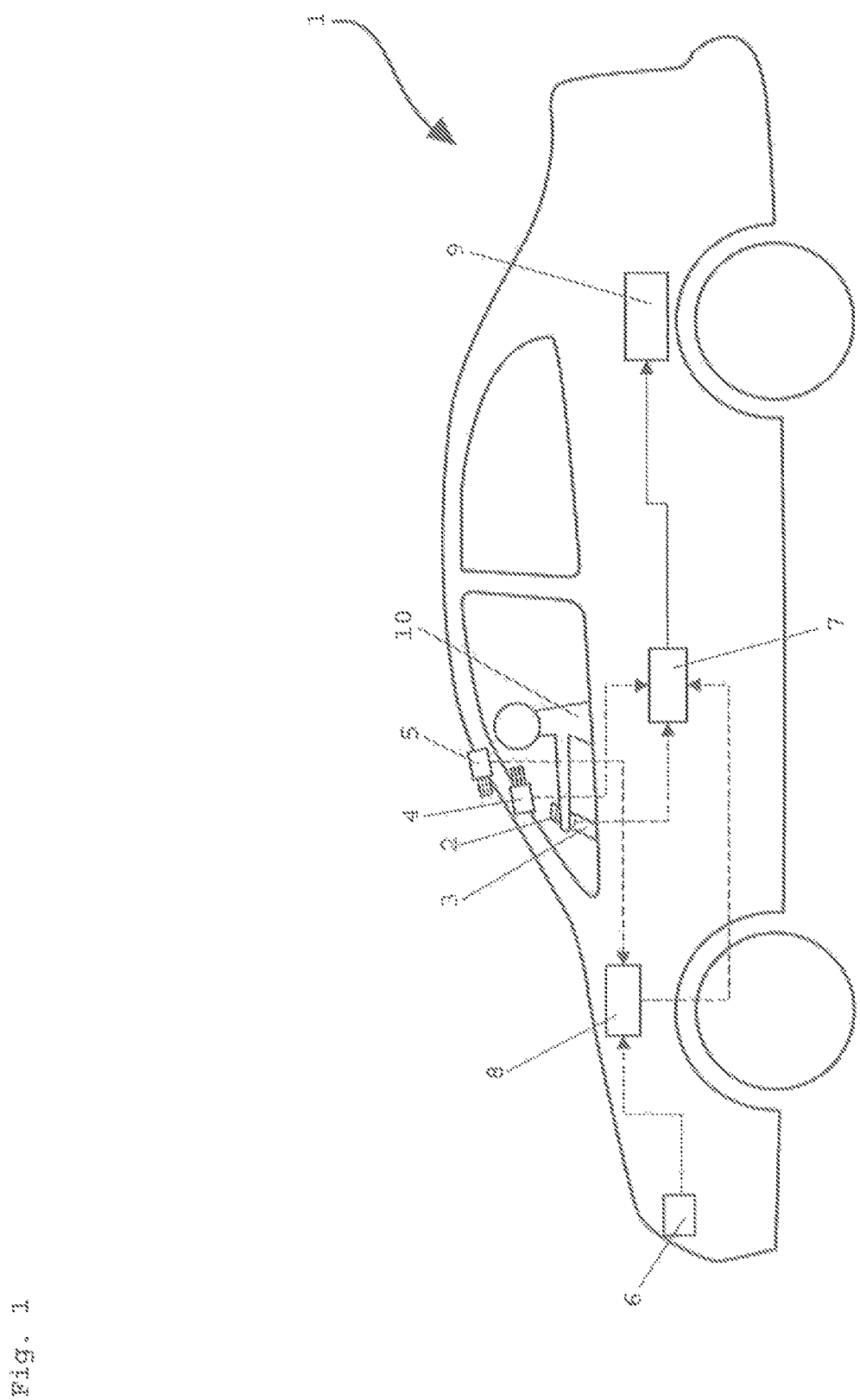
FIG. 1 is a side view of a vehicle having an exemplary embodiment of a system according to the invention.

FIG. 1 shows a vehicle 1 in the form of an automobile. The vehicle 1 comprises an exemplary embodiment of a system according to the invention with a driver monitoring device and with an environment detection device. The driver monitoring device comprises a sensor device 2 within a steering wheel 3 and a first camera 4. The environment detection device comprises a second camera 5 and a radar device 6. Furthermore, the system comprises a control unit 7 and a classifier 8. In addition, a driving function 9, for example a propulsion, steering or braking system of the vehicle 1, may be controlled by the control unit 7.

The driving function 9 may be automatically operated, for example at SAE Level 3 or higher, whereby a driver 10 of the vehicle 1 is enabled to turn their attention away from the traffic for a certain time. It may then arise that the vehicle 1 is situated in a traffic situation which may be classified as a traffic scenario A or B. FIGS. 2 and 3 each show an example of a traffic scenario A, and FIGS. 4 and 5 each show an example of a traffic scenario B.

In FIG. 2 the vehicle 1, depicted in highly simplified manner from above, is driving in a lane 11 behind a second vehicle 12. A third vehicle 13 suddenly filters in between the vehicle 1 and the second vehicle 12. In this traffic situation, a system limit is reached after a response time has elapsed. Too long a system delay may in this case require the driver 10 of the vehicle 1 to brake within the response time or the system to initiate an appropriate minimum risk maneuver in order to avoid a collision with the third vehicle 13. This traffic scenario A may be optically or visually identified and dealt with by the driver 10 of the vehicle 1, if the direction of view of the driver 10 is directed towards the traffic situation in which the vehicle 1 according to FIG. 2 is situated. On the other hand, the driver 10 of the vehicle 1 does not experience any feedback via the steering wheel 3 in the traffic situation shown in FIG. 2, and it is therefore very difficult to ensure timely intervention by the driver 10 unless the direction of view of the driver 10 is directed towards the traffic situation.

In FIG. 3 the vehicle 1, depicted in highly simplified manner from above, is driving in a first lane 14, which narrows and merges with a second lane 15 traveling in the same direction Ahead of the vehicle 1 (still) in the first lane 14 there is situated a second vehicle 16, which filters into the second lane 15 between a third vehicle 17 and a fourth vehicle 18. As vehicle 1 proceeds, it too must filter into the second lane 15 due to the narrowing of the first lane 14. Were the vehicle 1 automatically to follow the second vehicle 16, this might lead to a side-on collision for example with the fourth vehicle 18. In this traffic situation a system limit is reached after a response time has elapsed. To avoid the side-on collision with the fourth vehicle 18, the driver 10 of the vehicle 1 would themselves have to carry out the filtering within the response time or the system would have to initiate an appropriate minimum risk maneuver. This traffic scenario may be readily resolved by a driver 10 who is looking ahead with their view directed towards the traffic. If the driver 10 of the vehicle 1 has at least one hand on the steering wheel 3, sideways movement of the vehicle 1 or of the steering wheel 3 will be perceptible via the at least one hand of the driver 10 on the steering wheel 3, a function thereby being necessary which avoids the side-on collision.

These traffic scenarios A according to FIGS. 2 and 3 are better resolved by the driver 10 of the vehicle 1 if the driver 10 is observing the traffic, a fact which may be detected by the first camera 4 identifying whether the direction of view of the driver 10 is directed towards the traffic situation in which the vehicle 1 according to FIG. 2 or 3 is situated. On the other hand, in the present traffic scenarios A the driver 10 who, despite having their hands on the steering wheel 3, turns their gaze away from the traffic, might grasp and deal with the traffic scenario less well.

In FIG. 4 the vehicle 1, depicted in highly simplified manner from above, is driving in a lane 19 with a sharp bend 20. If a maximum steering torque of the vehicle 1 is insufficient to take the sharp bend 20, the vehicle 1 may drift away from the lane 19. In this traffic situation a system limit is reached after a response time has elapsed. To prevent the vehicle 1 from drifting away from the lane 19, the driver 10 of the vehicle 1 has to intervene actively within the response time in the steering of the vehicle 1 or the system has to initiate an appropriate minimum risk maneuver. In this case, the limitation of the steering torque may be identified at a very early point by the driver 10 of the vehicle 1 via the steering wheel 3 and timely intervention by the driver 10 is possible provided the driver 10 has at least one of their hands on the steering wheel 3. In contrast, it is unlikely that association of the curvature of the sharp bend 20 with a correspondingly necessary torque is well resolved optically or visually by the driver 10 of the vehicle 1, making timely intervention by the driver 10 barely possible.

In FIG. 5 the vehicle 1, depicted in highly simplified manner from above (position of the vehicle 1 shown on the left), is driving in a lane 21 with a bend 22, which does not have to be as sharp as the bend according to FIG. 4. To take the bend 22, the vehicle 1 needs to be steered to the right. If a sensor (not shown) of the system identifies steering movement of the vehicle 1 to the left in the region of the bend 22 (discrepancy between necessary and actual steering movement), this has the consequence that the vehicle 1 immediately takes an incorrect course and may for example move into the position of the vehicle 1 shown on the right in FIG. 5. In this traffic situation a system limit is reached after a response time has elapsed.

In this situation it is necessary for the driver 10 of the vehicle 1 to intervene actively within the response time in the steering movement of the vehicle 1 by turning the steering wheel 3 to the right, or the system initiates a corresponding minimum risk maneuver. In this case, a sudden implausible steering movement of the vehicle 1 is perceptible via the steering wheel 3 of the vehicle at the instant at which the implausible steering movement is performed. Timely intervention by the driver 10 is possible in this case, provided that the driver 10 has at least one of their hands on the steering wheel 3. In contrast, sudden implausible steering movements may only be perceived optically or visually when the steering movement of the vehicle 1 has been performed. Timely intervention by the driver 10 is therefore barely possible if the driver 10 does not have at least one hand on the steering wheel 3.

It may moreover arise that the lane 21 has ruts (not shown), the lane 21 is icy (black ice) or that strong side winds are acting on the vehicle 1 while it drives along the lane 21. In such traffic situations a system limit is reached after a response time has elapsed, wherein the system limit may optionally already have been reached beforehand. The driver has to adapt the driving behavior of the vehicle 1 accordingly, or the system must initiate an appropriate minimum risk maneuver to avoid an accident situation. The conditions on the lane 21 is felt by the driver 10 of the vehicle 1 via the steering wheel 3. This makes it possible for the driver 10 to adapt the driving behavior of the vehicle 1 or to intervene in critical situations. On the other hand, the above-described conditions on the lane 21 are difficult to perceive optically or visually.

These traffic scenarios B according to FIGS. 4 and 5 are better resolved by the driver 10 of the vehicle 1 if the driver 10 has at least one of their hands on the steering wheel 3, a fact which is detected by the sensor device 2. On the other hand, in the present traffic scenarios B, a driver 10 who, despite looking at the traffic, does not have their hands on the steering wheel 3, might grasp the traffic scenario B and thus the system limits less well.

Figure 6:
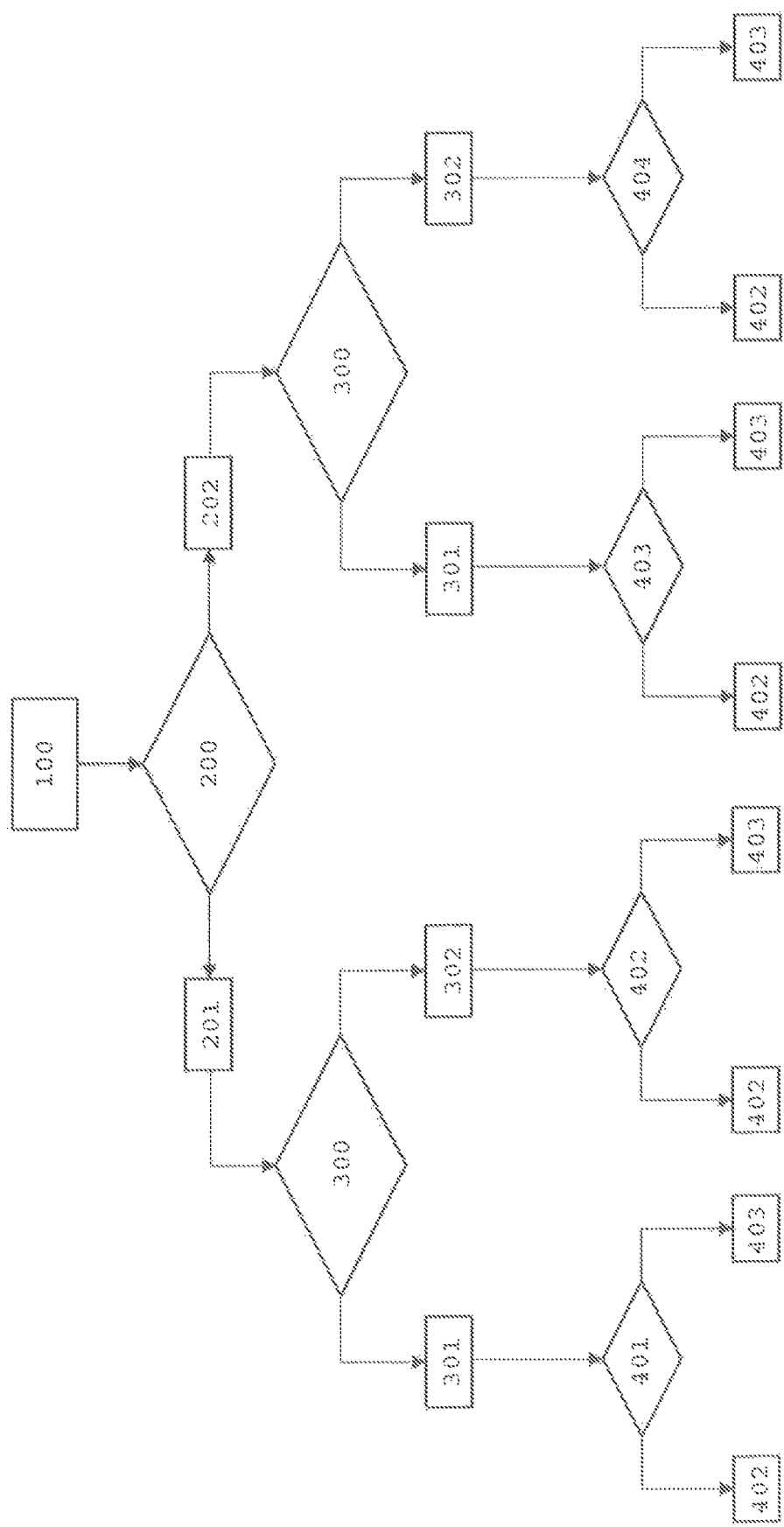
FIG. 6 is a functional representation of the system according to FIG. 1

Functions of the system of vehicle 1 according to FIG. 1 are explained in greater detail below in connection with FIGS. 6 and 7.

By means of the second camera 5 and the radar device 6, it is possible in a first step 100 to analyze an environment in which the vehicle 1 is currently situated. By means of the classifier 8, the previously analyzed environment may then be classified in a classification step 200 into traffic scenarios A (result 201) and B (result 202).

To this end, the second camera 5 may detect lane and object information in an external environment of the vehicle 1. The radar device 6 may moreover detect objects in a region in front of the vehicle 1. Corresponding data from the second camera 5 and the radar device 6 (objects, course of a lane and bend etc.) is supplied preprocessed to the classifier 8. On the basis of the environment data, the classifier 8 may classify whether a system limit is reached after a response time $t_L$ has elapsed. The response time $t_L$ is in this case a maximum possible response time before the system limit is reached. If a system limit is detected, the system classifies whether the traffic scenario is A (result 201) or B (result 202).

Figure 7:
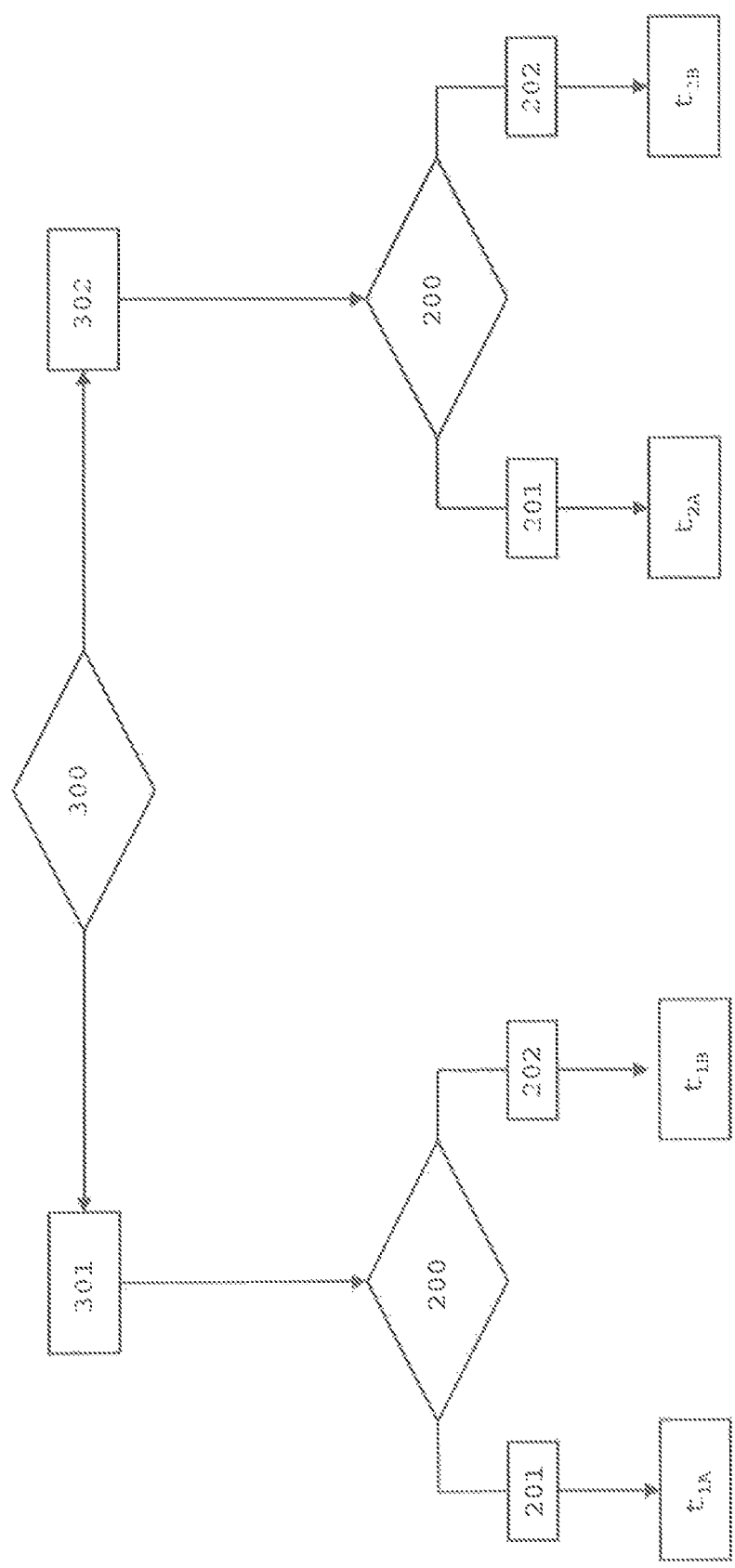
FIG. 7 is a flow chart of a calculation of response times of the driver for a function according to FIG. 7.

In combination with the results 201 and 202 of the classification 200, the control unit 7 may, in a further step 300, use the first camera 4 and the sensor device 3 to determine the driver's condition, this being shown in detail in FIG. 7.

The first camera 4 may in the process detect if a direction of view of the driver 10 is directed towards a traffic situation (result 301) in which the vehicle 1 is situated, and generate corresponding direction of view data. The sensor device 2 may for example detect by means of a capacitance sensor or a torque sensor (neither of which is shown) if at least one hand of the driver 10 of the vehicle 1 is in contact with the steering wheel 3 of the vehicle 1 (result 302), and generate corresponding contact data.

Based on the results 301 and 302 of the analysis 300 of the driver's condition and the results 201 and 202 of the classification 200, a respective estimated response time of the driver 10 may be continuously determined. The following four different response times are obtained a first response time $t_{1A}$ for a direction of view of the driver 10 directed towards the traffic situation (result 301) and for a traffic scenario classified as A (result 201)

a second response time $t_{1B}$ for a direction of view of the driver 10 directed towards the traffic situation (result 301) and for a traffic scenario classified as B (result 202)

a third response time $t_{2A}$ for at least one hand of the driver 10 detected on the steering wheel 3 (result 302) and for a traffic scenario classified as A (result 201), an a fourth response time $t_{2B}$ for at least one hand of the driver 10 detected on the steering wheel 3 (result 302) and for a traffic scenario classified as B (result 202).

As an alternative to the above-described continuous evaluation (which allows extension to multiple classes and dynamic adaptation), the response times may also be saved as predefined constants.

In the following comparison steps 401, 402, 403 and 404 respectively, the respectively determined response time $t_{1A}$, $t_{1B}$, $t_{2A}$ or $t_{2B}$ is compared by the control unit 7 with the maximum possible response time $t_L$ before the system limit is reached. Both the determined response times $t_{1A}$, $t_{1B}$, $t_{2A}$ and $t_{2B}$ and the response time $t_L$ before the system limit is reached are periods of time.

If it is identified in the comparison steps 401, 402, 403 and 404 that the determined response time $t_{1A}$, $t_{1B}$, $t_{2A}$ or $t_{2B}$ is shorter than the response time $t_L$ until the system limit is reached (result 402), the control unit 7 draws the conclusion that the driver 10 is capable of resolving the respective traffic scenario A or B within the response time $t_L$ and generates a take-over request to the driver 10. In this case, the control unit does not initiate a minimum risk maneuver.

If it is identified in the comparison steps 401, 402, 403 and 404 that the determined response time $t_{1A}$, $t_{1B}$, $t_{2A}$ or $t_{2B}$ is longer than the response time $t_L$ until the system limit is reached or is the same length as the response time $t_L$ until the system limit is reached (result 403), the control unit 7 draws the conclusion that the driver 10 is incapable of resolving the respective traffic scenario A or B within the response time $t_L$ and initiates a minimum risk maneuver. In this case, the control unit 7 does not generate a take-over request to the driver 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for a vehicle, the system comprising:
   a driver monitoring device;
   a sensor device being part of the driver monitoring device, the sensor device is configured to detect whether at least one hand of a driver of the vehicle is in contact with a steering wheel of the vehicle, and to generate corresponding contact data;
   a first camera, and the first camera is configured to detect whether a direction of view of the driver is directed towards a traffic situation in which the vehicle is situated and to generate corresponding direction of view data;
   an environment detection device with sensors for surroundings acquisition, such that the sensors for surroundings acquisition are configured to detect lane information and object information in an external environment of the vehicle and to detect objects in a region in front of the vehicle;
   a control unit; and
   a classifier, and the sensors for surroundings acquisition are configured to acquire a traffic scenario from the detected objects, lane information and object information and transmit it to the classifier;
   wherein the classifier is configured to identify, on the basis of the traffic scenario, whether a system limit is reached within a response time ($t_L$) and, if a system limit is identified, to classify the traffic scenario into a traffic scenario A and a traffic scenario B, wherein the driver of the vehicle may better resolve the traffic scenario A if the direction of view of the driver is directed towards the traffic situation in which the vehicle is situated, and wherein the driver of the vehicle may better resolve the traffic scenario B if at least one hand of the driver is in contact with the steering wheel;

wherein the control unit is configured, in the case of an identified system limit and a traffic scenario classified as A or B, to evaluate on the basis of the contact data or the direction of view data whether the driver is capable of resolving the traffic scenario A or B within the response time ($t_L$), wherein the control unit is configured to compare an estimated response time ($t_{1A}$, $t_{1B}$, $t_{2A}$ or $t_{2B}$) of the driver with the response time ($t_L$) until the system limit is reached.

2. The system of claim 1, wherein the estimated response time of the driver is stored as a constant and the control unit may access the constant.

3. The system of claim 1, wherein the control unit is configured to determine continuously the estimated response time ($t_{1A}$, $t_{1B}$, $t_{2A}$ or $t_{2B}$) of the driver on the basis of the traffic scenario classified as A and the direction of view data or on the basis of the traffic scenario classified as B and the contact data.

4. The system of claim 1, wherein the control unit is configured, in the case of an identified system limit and a traffic scenario classified as A,
 to draw the conclusion that the driver is capable of resolving the traffic scenario A within the response time ($t_L$), if the direction of view data include the fact that the direction of view of the driver is directed towards the traffic situation in which the vehicle is located, and
 to generate a take-over request to the driver, and
 to draw the conclusion that the driver is not capable of resolving the traffic scenario A within the response time ($t_L$), if the direction of view data include the fact that the direction of view of the driver is not directed towards the traffic situation in which the vehicle is located, and
 to initiate a minimum risk maneuver of the vehicle.

5. The system of claim 1, wherein the control unit is configured, in the case of an identified system limit and a traffic scenario classified as B,
 to draw the conclusion that the driver is capable of resolving the traffic scenario B within the response time ($t_L$), if the contact data include the fact that at least one hand of the driver of the vehicle is in contact with the steering wheel of the vehicle, and
 to generate a take-over request to the driver, and
 to draw the conclusion that the driver is not capable of resolving the traffic scenario B within the response time ($t_L$), if the contact data include the fact that neither hand of the driver of the vehicle is in contact with the steering wheel of the vehicle, and
 to initiate a minimum risk maneuver of the vehicle.

6. The system of claim 1, the sensor device further comprising a capacitance sensor.

7. The system of claim 1, wherein the sensor device is configured to measure a torque from the hand of the driver acting on the steering wheel.

8. The system of claim 1, wherein the traffic scenario A involves the filtering-in of a further vehicle in the region ahead of the vehicle or the merging of two directly adjacent lanes in the same direction of travel in the region ahead of the vehicle.

9. The system of claim 1, wherein the traffic scenario B includes a sharp bend, a discrepancy between the course of a bend and a steering angle of the vehicle or a sudden extreme change in road conditions.

10. A vehicle comprising a system, the system further comprising:
 a driver monitoring device;
 a sensor device being part of the driver monitoring device, the sensor device is configured to detect whether at least one hand of a driver of the vehicle is in contact with a steering wheel of the vehicle, and to generate corresponding contact data;
 a first camera, and the first camera is configured to detect whether a direction of view of the driver is directed towards a traffic situation in which the vehicle is situated and to generate corresponding direction of view data;
 an environment detection device with sensors for surroundings acquisition, such that the sensors for surroundings acquisition are configured to detect lane information and object information in an external environment of the vehicle and to detect objects in a region in front of the vehicle;
 a control unit; and
 a classifier, and the sensors for surroundings acquisition are configured to acquire a traffic scenario from the detected objects, lane information and object information and transmit it to the classifier;
 wherein the classifier is configured to identify, on the basis of the traffic scenario, whether a system limit is reached within a response time ($t_L$) and, if a system limit is identified, to classify the traffic scenario into a traffic scenario A and a traffic scenario B, wherein the driver of the vehicle may better resolve the traffic scenario A if the direction of view of the driver is directed towards the traffic situation in which the vehicle is situated, and wherein the driver of the vehicle may better resolve the traffic scenario B if at least one hand of the driver is in contact with the steering wheel;
 wherein the control unit is configured, in the case of an identified system limit and a traffic scenario classified as A or B, to evaluate on the basis of the contact data or the direction of view data whether the driver is capable of resolving the traffic scenario A or B within the response time ($t_L$), wherein the control unit is configured to compare an estimated response time ($t_{1A}$, $t_{1B}$, $t_{2A}$ or $t_{2B}$) of the driver with the response time ($t_L$) until the system limit is reached.

11. A method, comprising the steps of:
 providing a driver monitoring device;
 providing a sensor device being part of the driver monitoring device;
 providing a first camera;
 providing an environment detection device with sensors for surroundings acquisition;
 providing a control unit; and
 providing a classifier;
 detecting with the sensor device whether at least one hand of a driver of the vehicle is in contact with a steering wheel of the vehicle, and to generate corresponding contact data;
 detecting with the first camera whether a direction of view of the driver is directed towards a traffic situation in which the vehicle is situated and to generate corresponding direction of view data;
 detecting, with the environment detection device with sensors for surroundings acquisition, lane information and object information in an external environment of the vehicle and to detect objects in a region in front of the vehicle;

acquiring, with the environment detection device with sensors for surroundings acquisition, a traffic scenario from the detected objects, lane information and object information and transmitting it to the classifier;

identifying with the classifier, on the basis of the traffic scenario, whether a system limit is reached within a response time ($t_L$) and, if a system limit is identified, classifying the traffic scenario into a traffic scenario A and a traffic scenario B, wherein the driver of the vehicle may better resolve the traffic scenario A if the direction of view of the driver is directed towards the traffic situation in which the vehicle is situated, and wherein the driver of the vehicle may better resolve the traffic scenario B if at least one hand of the driver is in contact with the steering wheel;

evaluating with the control unit, in the case of an identified system limit and a traffic scenario classified as A or B, on the basis of the contact data or the direction of view data whether the driver is capable of resolving the traffic scenario A or B within the response time ($t_L$);

comparing, with the control unit, an estimated response time ($t_{1A}$, $t_{1B}$, $t_{2A}$ or $t_{2B}$) of the driver with the response time ($t_L$) until the system limit is reached.

\* \* \* \* \*